United States Patent [19]
Kelsey

[11] 4,068,476
[45] Jan. 17, 1978

[54] SOLAR DRIVEN POWER UNIT

[75] Inventor: Christopher George Kelsey, Glenalta, Australia

[73] Assignees: Andrew Graham Brown; K. E. Ellis Holdings Pty. Ltd., both of Australia

[21] Appl. No.: 523,909

[22] Filed: Nov. 14, 1974

[30] Foreign Application Priority Data

Nov. 15, 1973 Australia ................ 5654/73

[51] Int. Cl.² ............................ F01K 25/10
[52] U.S. Cl. .................... 60/671; 60/325; 126/271; 417/379; 417/404
[58] Field of Search .......... 60/641, 651, 670, 690, 60/692, 671, 325; 417/53, 375, 379, 403, 397, 404, 401; 126/271

[56] References Cited

U.S. PATENT DOCUMENTS

| | | | |
|---|---|---|---|
| 1,820,236 | 8/1931 | Loud | 417/397 X |
| 2,688,923 | 9/1954 | Bonaventura et al. | 417/379 |
| 2,751,144 | 6/1956 | Troendle | 417/375 X |
| 2,938,347 | 5/1960 | Stugis | 60/52 |
| 2,969,637 | 1/1961 | Rowekamp | 60/641 |
| 3,019,735 | 2/1962 | Moeller et al. | 91/411 A X |
| 3,216,199 | 11/1965 | Shaw et al. | 60/670 |
| 3,470,943 | 10/1969 | Van Huisen | 60 X/641 |
| 3,658,387 | 4/1972 | Roper | 417/403 X |
| 3,839,863 | 10/1974 | Frazier | 60/325 X |

Primary Examiner—Allen M. Ostrager
Attorney, Agent, or Firm—Jay L. Chaskin

[57] ABSTRACT

A power unit, energizable by solar heat, having a thermodynamic system including an evaporator, vapor pressure actuated motor, pump and condenser, the motor being arranged to operate upon evaporation of fluid in the evaporator, which is subsequently condensed and pumped back into the evaporator. The vapor pressure actuated motor is coupled to a hydraulic pump which in turn drives a hydraulic motor. The fluid in the thermodynamic circuit is a low temperature boiling fluid, preferably a fluoro carbon refrigerant, so that use can be made of "low grade" heat.

12 Claims, 6 Drawing Figures

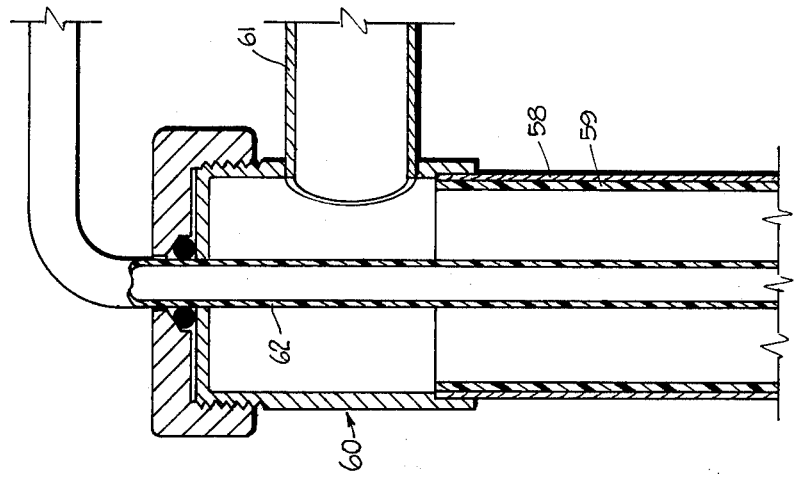
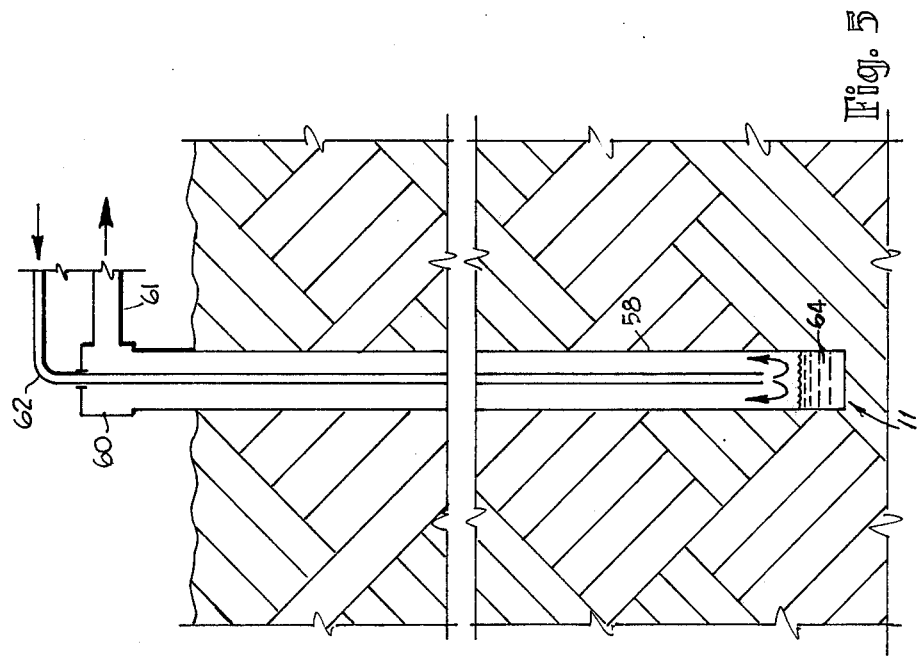

SOLAR DRIVEN POWER UNIT

This invention relates to a power unit which can be driven by low grade heat, and is particularly suitable for being driven by solar energy.

BACKGROUND OF THE INVENTION

A number of proposals have been made heretofore for the harnessing of the sun's power, and for example it has been proposed to utilise banks of reflectors which heat water contained in tubes to evaporate the water into steam, transport the steam to the location of an engine, and drive the engine with the steam. Such proposals have not reached the stage of general acceptance, one of the reasons being the long steam lines which are required, and another being the high capital cost. Long steam lines essentially have associated with them a loss of efficiency, and furthermore to boil water it is necessary to create temperatures within the pipe of the order of 120° C. Such temperatures are readily obtainable from the sun's rays, but it is necessary to always direct a mirror towards the sun to achieve the high temperatures. The result of these two disabilities is a very high capital cost and high maintenance costs for operating an installation.

The main object of this invention is to provide means whereby "low grade" heat energy may be translated into useful mechanical energy without the need for attempting to obtain high temperatures, and further to achieve the mechanical energy without the use of long steam lines (with consequential heat losses). It is a further object to provide a power unit which does not involve excessive capital expenditure, and although this invention results in a slightly higher efficiency than has been obtained heretofore, this invention will be seen to be so simple that it is probably less expensive to utilise larger units than to incorporate efficiency improvement into the equipment, but of course both expedients may be used when high power outlet is required.

BRIEF SUMMARY OF THE INVENTION

Briefly the invention comprises a closed circuit type of fluid thermodynamic cycle having a vapour pressure operated motor arranged to be actuated by heat, the closed hydraulic circuit having a pump which is mechanically coupled to the vapour pressure motor and in turn drives a hydraulic motor.

By this invention two major features are combined. Firstly, the closed fluid thermodynamic circuit enables use to be made of fluids having characteristics most useful for specific applications, and secondly, the use of a hydraulic circuit as the slave circuit of the power unit enables use to be made of long lines without high cost or high losses. Still further, the invention enables exceedingly simple mechanical devices to be interconnected, the mechanical devices being of such low cost that the relatively low efficiency usually associated with solar energy, waste heat from boilers and the like, is of secondary importance.

More specifically a power unit according to this invention comprises an evaporator, a vapour pressure actuated motor, a first pump, a mechanical coupling between the motor and first pump, a condenser, and conduits and valves interconnecting said evaporator, motor, first pump and condenser in a thermodynamic circuit, and fluid in both liquid and vapour phases contained in the circuit, such that heating the liquid phase in the evaporator causes evaporation and the vapour at pressure in turn actuates the motor, exhausting vapour which is condensed in the condenser and pumped by the first pump through the evaporator to complete the fluid thermodynamic cycle; the unit also comprising a second pump being a hydraulic pump, a hydraulic motor, hydraulic conduits and valves coupling the second pump and hydraulic motor in a hydraulic circuit, and a mechanical coupling between the vapour pressure actuated motor and the hydraulic pump such that operation of the vapour pressure actuated motor also causes operation of the hydraulic pump and consequential operation of the hydraulic motor.

BRIEF DESCRIPTION OF THE DRAWINGS

An embodiment of the invention is described hereunder in some detail with reference to and is illustrated in the accompanying drawings in which:

FIG. 5 illustrates an alternative method of obtaining "low grade" heat from a subterranean source, and FIG. 6 is an enlarged detailed sectional view of portion of the conduits illustrated in FIG. 5.

Figure 1:
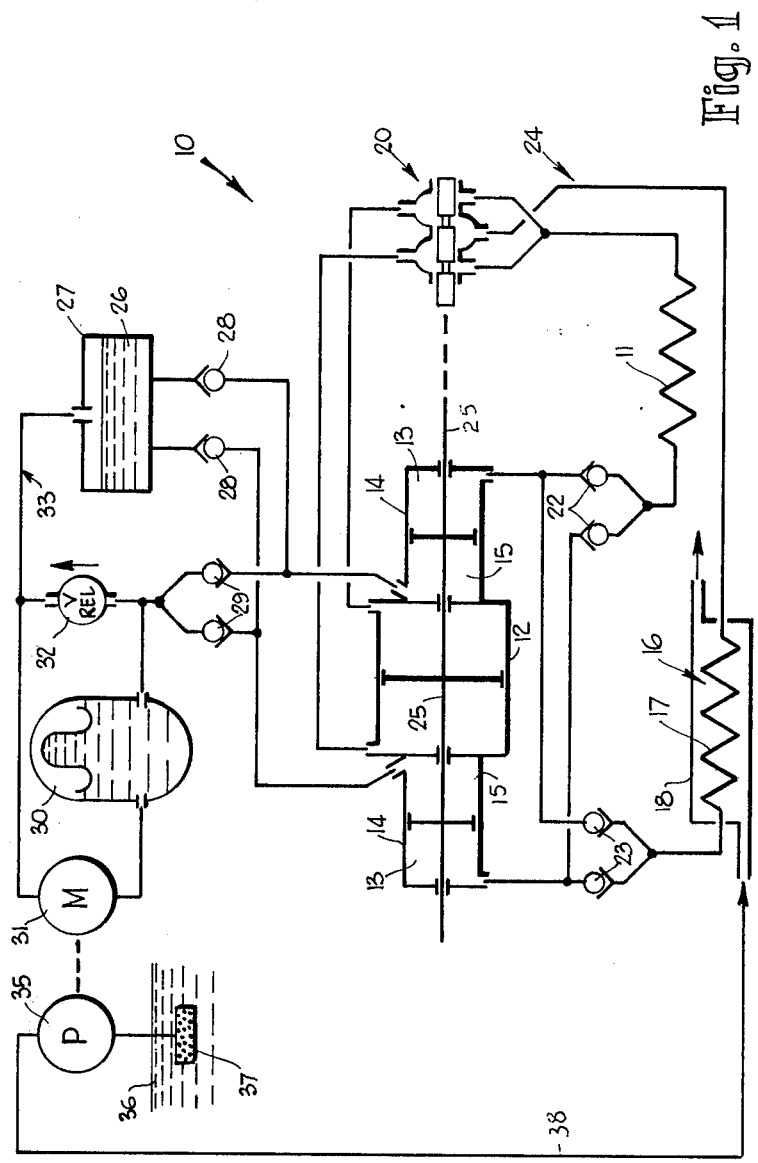
FIG. 1 is a diagrammatic representation of the power unit.

Referring first to the diagrammatic representation of FIG. 1, a power unit designated 10 comprises an evaporator 11 in which the liquid phase of fluid contained in the thermodynamic circuit is heated, a vapour pressure actuated motor constituted by a double acting cylinder 12, a first pump 13 which is constituted by the outer ends of respective double acting cylinders 14, a second pump being a hydraulic pump and designated 15 constituted by the inner ends of the respective cylinders 14, and a condenser 16 which itself comprises a coil 17 contained in a water cooling jacket 18.

Figure 4:
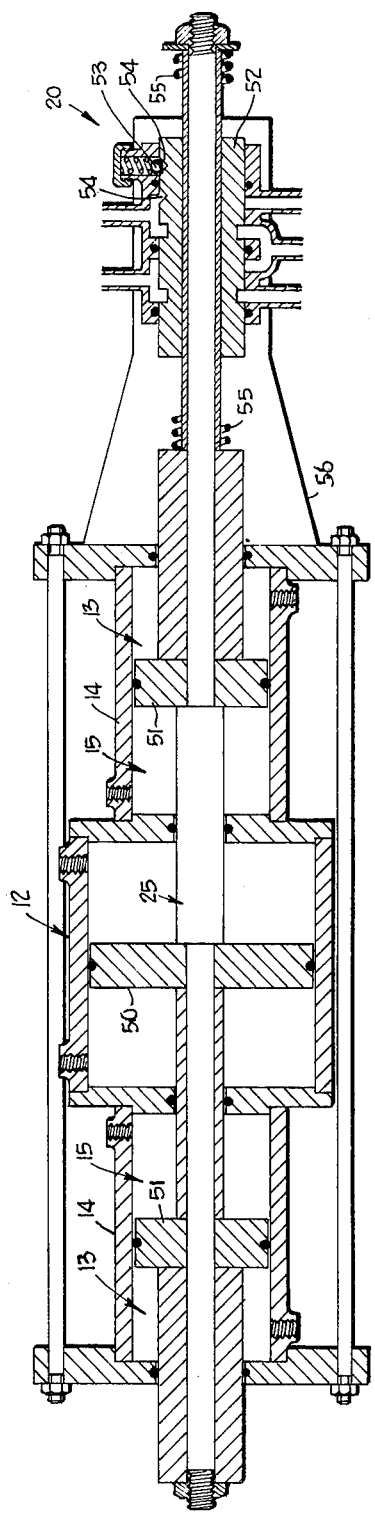
FIG. 4 is a central section showing the vapour pressure actuated motor, first pump, second pump, and mechanical couplings therebetween.

The motor cylinder 12 and the pump cylinders 13 form portion of a fluid thermodynamic circuit, and the circuit also includes a double acting spool valve designated 20 (mechanical details of which are shown in FIG. 4), the spool valve 20 being interposed between the motor cylinders 12 on the one hand and the evaporator and condenser coils 11 and 16 respectively on the other. Interposed between the first pump 13 and the evaporator coil 11 are a pair of one way valves designated 22, while interposed between the first pump 13 and the condenser coil 17 is a second pair of one way valves designated 23. The conduits of the fluid thermodynamic circuit are generally designated 24. It will be seen that two of the conduits 24 directly couple parts of the valve 20 to respective parts of the cylinder 12.

The second pump 15 which constitutes the hydraulic pump is actuated upon oscillatory movement of the central coupling rod 25 which extends through the cylinders 12 and 14 and is coupled to the spool of the valve 20. The two pumps 15 alternatively draw in hydraulic fluid 26 from a tank 27 (through one way valves 28,) and while one portion of the pump 15 is drawing hydraulic fluid into the cylinder 14 the other portion is expelling fluid through the one way valves 29 into the accumulator 30. A motor 31 (for example a vane type or gear type hydraulic motor) is driven by the fluid at pressure, and discharges the exhaust fluid back into the tank 27. A pressure relief valve 32 in circuit and functions as an overload valve. The conduits of the hydraulic circuit are generally designated 33.

The motor 31 is mechanically coupled to a pump 35, in this embodiment the pump 35 being a water pump and drawing water from a reservoir source 36 through a filter 37, the water being conducted through the water conduit 38 and passing through the jacket 18 to cool the condensing fluid in the coil 17.

Although not illustrated in FIG. 1, the motor 31 and pump 35 may be conveniently assembled together and lowered into a bore hole for the pumping of water 36 from the base of the hole. If this is done, the bore casing can conveniently contain the conduits 33 and 38. However it will be clear to those skilled in the art that the use to which the motor 31 is placed can be widely varied.

Figure 3:
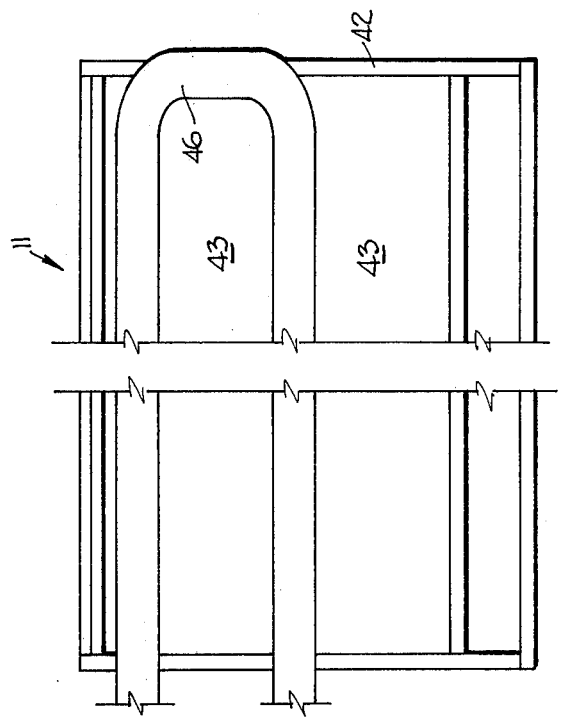
FIG. 3 is a side elevation of FIG. 2.
Figure 2:
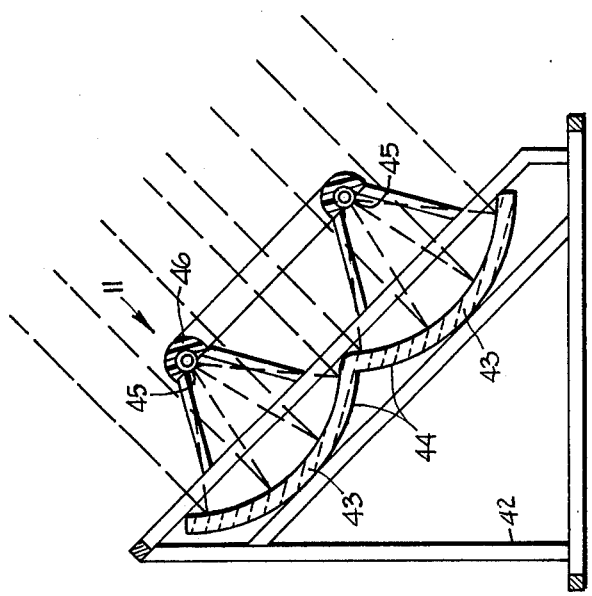
FIG. 2 is a section illustrating one form of solar energy collecting device.

The fluid which is contained in the fluid thermodynamic circuit can be selected to suit particular requirements. If a mirror type of device is used as illustrated in FIGS. 2 and 3, the fluid could for example be a fluoro carbon refrigerant number 112 (C2CL4F2) or 113 (C2CL3F3). Such products are sold under various trade marks, for example Freon 112 or Freon 113. They have respective boiling points of 92.8° C and 47.57° C. These boiling points increase when pressure is increased in accordance with the normal thermodynamic laws relating to these refrigerants. In FIG. 2, a frame 42 supports a pair of glass mirrors 43 of parabolic cross sectional shape, the rear surfaces 44 thereof reflecting the sun's rays onto the tube 45 (insulated by half round insulation 46). Such a device is more expensive than an absorber, but is capable of handling refrigerants having higher boiling points. If an ordinary absorber is used (not illustrated herein) a more suitable refrigerant would be fluoro-carbon refrigerant number 11 (CCL3F) sold for example under the trade mark Freon 11, this having a normal boiling point of 23.82° C.

Referring now to FIG. 4, it will be seen that the mechanical devices required for the power unit are exceedingly simple. The pump is constituted by a simple double acting cylinder 12, and this is flanked on each side by the two further double acting cylinders 14. The outer ends of the cylinders 14 constitute the first pump 13 for the pumping of liquid refrigerant back into the evaporator 11 (see FIG. 1) while the second pump 15 is constituted by the inner ends of the cylinders 14. The hydraulic fluid 26 is selected to be a fluid having some lubrication properties, and it is for this reason that the pump 15 has its cylinders interposed between the pumps 12 and 13, some lubrication passing down into the latter cylinder areas. The central coupling rod 25 is effective in coupling together the pistons designated 50 and 51 of the cylinders 12 and 14 respectively, and this rod also extends through and is slidable within the spool 52 of the spool valve 20. The spool valve 20 is a standard spool valve, but is provided with a spring loaded ball 53 which selectively engages in one of two notches 54 to releasably retain the spool in either one of its two positions. The rod 25 carries on its outer end abutment members, which comprise compression springs 55, and which exert sufficient pressure against the spool 52 near the end of either one of the strokes of the rod 25 to "snap" the spool from one operating position to the next. A bracket 56 retains the spool valve to a cylinder 14.

Since this invention makes it possible to utilise "low grade" heat, the power unit can be powered by sources other than solar heat, and for example in certain areas warm subterranean streams can be tapped for evaporating the refrigerant. In FIGS. 5 and 6 there is illustrated a means for achieving this, the means comprising an outer metal tube 58 lined with a plastic tube 59 (to impart some degree of heat insulation), the outer tube 58 terminating at its other end in a head 60 having a vapour outlet pipe 61 thereon. The head 60 sealably engages around an inner plastic tube designated 62, and the arrangement is such that the tube 62 forms portion of the conduit 24 which carries liquid refrigerant into the evaporator portion (that is the lower portion) of the metal tube 58 which is designated 64, the tube 58 forming another portion of the conduit 24 for conducting the evaporated vapour to the double acting cylinder 12 where it functions as previously as a motor.

The thermodynamic cycle of course is a very inefficient cycle, the diagram being a simple rectangle. However, efficiency can be improved if desired by inserting a mechanically operated valve in the conduit leading between the master fluid circuit and each of the transducers, so that some expansion of the gas takes place. In the alternative, the transducer assembly may be duplicated, and in much the same way as the steam engine is provided with a high pressure and low pressure cylinder, use may be made of a low pressure secondary transducer assembly actuated by discharge of gas from the first transducer assembly. In this way much of the energy contained in the gas is converted into useful mechanical energy.

A higher efficiency can be obtained by utilising the condenser 17 to evaporate a refrigerant having a further and different range of the temperatures (for example F12, CC12F2), and thus having a two stage evaporation. In contrast to many previously proposed thermodynamic circuits, a temperature differential of 50° C is sufficient to have an effective power unit.

When the invention is to be used on larger installations, it is merely necessary to couple the outputs of the respective accumulators together so that a single large output of hydraulic fluid at pressure is obtainable. It will be seen that this can be transmitted over large distances without the appreciable loss which otherwise occurs in steam installations.

The following is an example of an installation which has been constructed and proved. The figures quoted herein are conservative, and the power output and efficiencies obtained could normally be expected to exceed those mentioned in this example:

1. Gas used

Fluoro carbon 11 (CCL3F) (Trichloro-fluoro-methane)

Condensing temperature of 24° C and operating temperature of 90° C provided 96 lbs. per square inch pressure.

Back pressure approximately 14 p.s.i. differential pressure of 82 p.s.i.

Volume differential gas to liquid:
37° at 90° C: 249° at 24° C.

2. Relation of Piston sizes

Hydraulic motor pressure 1500 p.s.i.

Effective input pressure of vapour in motor 82 p.s.i. at 90° C.

Pressure to overcome sticktion and motivation approximately 9 p.s.i.

3. Pressure required to charge heat exchanger with liquid gas

Injected fluid at 24° C.
Volume differential approximately 42%
Pressure loss incurred for charging heat exchanger (82/42) = 1.7 p.s.i.,
therefore total effective pressure available for hydraulic circuit 71 p.s.i. (in cylinder 12)
Pressure differential 1500/71 = 21 (approximately)
Diameter of piston in cylinder 12 = 4 inch; area = 12.56 square inches.
Sectional area of piston rod = 0.6 square inches, therefore effective area of piston 51 = 11.96 square inches.
Effective area of second pump 15 (the hydraulic pump), that is, the area of piston 51 less the area of central coupling rod 25, = 11.96/21 = 0.57 square inches approximately.

4. Power Output

Stroke of piston = 5 inches, therefore swept volume of gas = 62.8 cubic inches per stroke.
Volume of oil per stroke = 0.57 X 5 = 2.85 cubic inches.
Hydraulic motor selected requires 157 cubic inches per minute = 52.7 strokes per minute, or 26.35 cycles per minute of the motor 12.
Volume of vapour per minute = 62.8 X 52.6 = 3309 cubic inches per minute (54.2 liters)

Weight of gas at 90° C = 1.904
Using enthalpy tables:
At 90° C 156Kcal/Kg of the vapour
At 24° C 105Kcal/Kg of the liquid.

Therefore Kcal per Kg = 51 of the total Kcal per minute = 97.18, or 5830Kcal per hour = 23 120 b.t.u. = 9.08 horse power (British)
Horse power output of hydraulic motor at 157 cubic inch per minute at 1500 p.s.i. = 0.57 (from motor specification) therefore efficiency = output horse power/input horse power = 0.57/9.08 = 6.2%.

Energy available sunlight falling on earth's surface on a clear day reaches from 300 to 350 b.t.u. per hour per square foot at noon. Taking an average of an 8 hour day at 230 b.t.u., and utilising simple black plate heat absorbers, requirement is 231.30/230, that is, approximately 100 square feet.

As stated above, the figures of this example are essentially conservative but nevertheless illustrate that a higher utilisation of solar energy is achieved from use of this invention than in the most previously proposed devices (which are usually about 4% efficient). By utilising low friction materials, making use of gas expansion within the motor 12, and utilising a multi-stage thermodynamic circuit, efficiencies can be increased considerably, but it should be noted that the cost to increase size is so small that to obtain a higher output it is usually more desirable to utilise a larger unit.

I claim:

1. A power unit comprising a double acting vapour pressure actuated motor, a first pump, a mechanical coupling between the motor and first pump, a condenser, an evaporator, conduits and valves interconnecting said evaporator, motor, first pump and condenser in a closed thermodynamic circuit, and a fluorocarbon refrigerant fluid in both liquid and vapour phases contained in the circuit, such that heating the liquid phase in the evaporator causes evaporation of the vapour at pressure which in turn applies pressure to one side of the motor and thereby actuates the motor, actuation of the motor effecting exhaustion of vapour from the other side of the motor into the condenser wherein the vapour is condensed, and then pumped as liquid by the first pump from the condenser, and through the evaporator to complete the fluid thermodynamic cycle, the unit also comprising a second pump being an hydraulic pump, an hydraulic motor, hydraulic conduits and valves coupling the second pump and hydraulic motor in hydraulic circuit, and a mechanical coupling between the vapour pressure actuated motor and the hydraulic pump such that operation of the vapour pressure actuated motor also causes operation of the hydraulic pump and consequential operation of the hydraulic motor.

2. A power unit according to claim 1 wherein said vapor pressure actuated motor comprises the central cylinder of three double acting cylinders lying in end to end relationship, said mechanical coupling comprising a single piston rod common to all cylinders, said first and second pumps comprising the other said double acting cylinders.

3. A power unit according to claim 2 wherein said first pump comprises the outer ends of said other double acting cylinders and said hydraulic pump comprises the inner ends thereof.

4. A power unit according to claim 2 wherein one of said valves is a double acting spool valve.

5. A power unit according to claim 2 wherein one of said valves is a spool valve, and wherein two of said thermodynamic circuit conduits couple ports of the spool valve to respective ports of the central double acting cylinder.

6. A power unit according to claim 2 wherein one of said valves is a spool valve, two of said thermodynamic circuit conduits couple ports of the spool valve to respective ports of the central double acting cylinder, and further comprising means securing the spool valve with respect to a said cylinder, said piston rod having an extension passing through and being slidable in the spool of the spool valve, and abutments on the piston rod cooperable with respective ends to the said spool at the ends of respective strokes of the piston rod, said abutments changing the spool position from one operating position to another and thereby reversing fluid flow through said conduits coupling the spool valve and the central double acting cylinder.

7. A power unit according to claim 2 wherein one of said valves is a spool valve and two of said thermodynamic conduit circuits couple said spool valve respectively to the outlet end of the evaporator and the inlet end of the condenser.

8. A power unit according to claim 2 wherein one of said valves is a spool valve and two of said thermodynamic circuit conduits couple said respective ports of the first pump to the inlet end of the evaporator and the outlet end of the condenser, and comprise non-return valves.

9. A power unit according to claim 1 wherein said hydraulic circuit also comprises a tank, an accumulator, a pressure relief valve, two non-return valves between the tank and hydraulic cylinder, and a further two non-return valves between the accumulator and hydraulic cylinder.

10. A power unit according to claim 1 further comprising a frame and a longitudinally extending heat reflecting mirror on the frame, said evaporator having a tubular member supported by the frame at a locality to intercept heat when reflected by the mirrors.

11. A power unit according to claim 1 wherein said evaporator comprises a solar heat absorber.

12. A power unit according to claim 1 wherein said evaporator comprises a tube extending into the ground.

* * * * *